Jan. 11, 1927.
H. A. SCHWARZ, JR
1,613,678
GAUGE
Filed Feb. 26, 1926
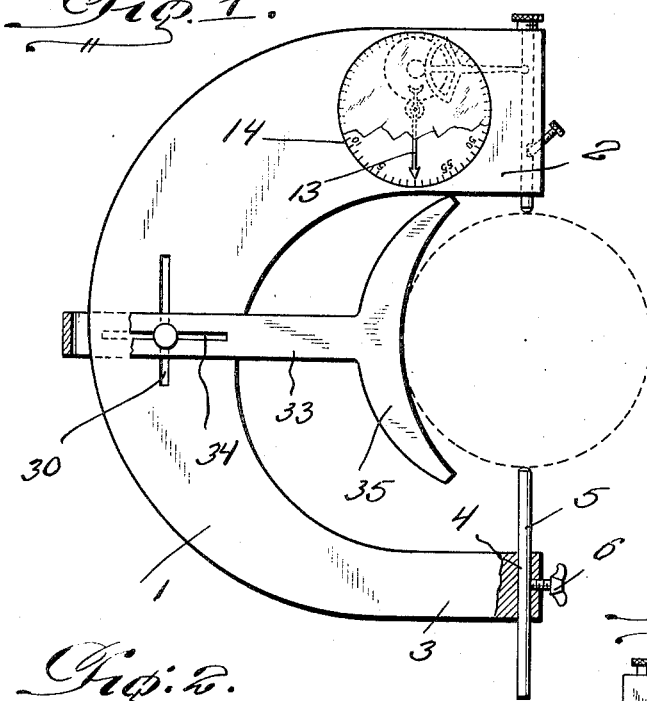
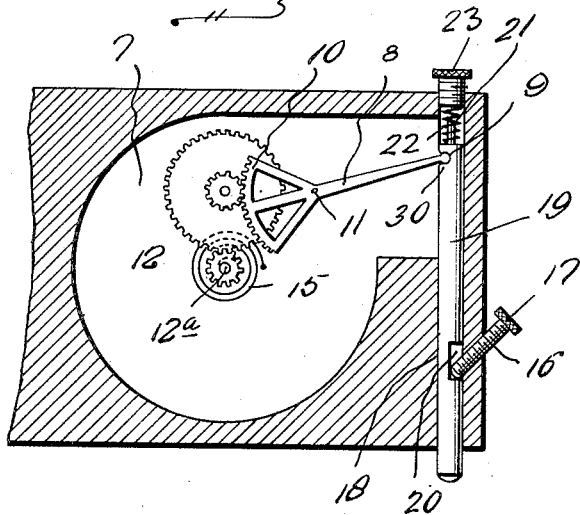
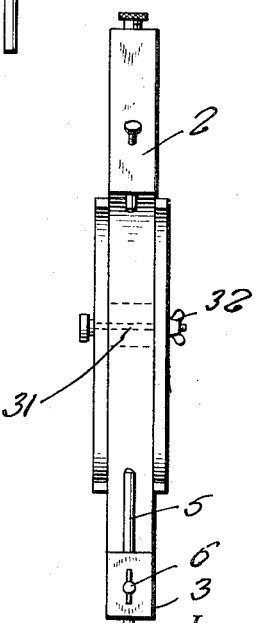
Inventor
H.A.Schwarz, Jr.
By Clarence A. O'Brien
Attorney Patented Jan. 11, 1927.

1,613,678

UNITED STATES PATENT OFFICE.

HENRY A. SCHWARZ, JR., OF RICKETTS, IOWA.

GAUGE.

Application filed February 26, 1926. Serial No. 90,871.

My present invention has to do with gauges, and contemplates the provision of a gauge embodying a steady rest and adapted to be used to advantage, by virtue of said rest, for the accurate gauging of shafts and the like while the shafts are being rotated, the gauge being susceptible of ready application to a shaft or the like and being of quick reading type.

Other objects and practical advantages of the invention will be fully understood from the following description and claims when the same are read in connection with the drawings, accompanying and forming part of this specification, in which:—

Figure 1 is a view showing as applied the gauge constituting the best practical embodiment of my invention, the major portion of the gauge being illustrated in side elevation but with some parts in section.

Figure 2 is an enlarged longitudinal vertical section taken through the upper arm of the gauge body and showing the parts appurtenant to said arm.

Figure 3 is a view taken from a viewpoint at the right of Figure 1 and showing the gauge per se in edge elevation.

Similar numerals of reference designate corresponding parts in all of the views of the drawings.

The body of my novel gauge is designated by 1 and the upper arm 2 of the gauge is thicker than the lower arm 3 in about the proportion illustrated, the lower arm 3 being provided with a bore 4 to receive a pin 5, and the said pin 5 being adjustably fixed with respect to the arm 3 through the medium of a wing nut 6.

The upper arm 2 of body 1 is chambered as designated by 7 in Figure 2, and in the said chamber 7 is disposed a swinging lever 8 having a round head 9 at its outer end and a sector gear 10 at its inner end. The fulcrum point of the said lever 8 being designated by 11. Connected by a train of gearing 12 with the sector gear 10 is an arbor 12ª, the said arbor 12ª being equipped with a hand or pointer 13, Figure 1, designed for use in conjunction with a circular scale 14, which, within the purview of my invention, may have any appropriate or desired graduation. Coiled about the arbor 12ª and connected at one end therewith and its opposite end with the arm 2 of the body 1 is a spring 15. The said spring 15 has for its function to take up the slack of the gears in the train 12 in one direction, and in that way contribute to the accuracy of the functioning of the gauge. Threaded in the end of the arm 2 is an inclined screw 16 having a knurled head 17, and formed in the said arm 2 and communicating with the chamber 7 and also communicating with the inner end of the threaded bore in which the screw 16 is disposed, is a bore 18. This bore 18 is for the reception of a pin 19, designed to bear against a shaft at a diametrically opposite point to the inner end of the pin 5. The said pin 19 is recessed at 20 to receive the inner end of the retaining pin 16, and the outer end of said pin 19 is reduced as designated by 21 to rest within a coiled expansion spring 22 which is interposed between the pin 19 and a nut member 23, threaded in the arm 2 in alignment with the bore 18, and designed to afford a convenient means for the tensioning of the spring 22.

At 30 the body 1 is provided with a vertical transverse slot, the said slot being designed for the reception of a transverse headed pin 31 on which is a winged or other appropriate nut 32. The bolt 31 also extends through and effects connection of the shank of a steady rest 33 to the body 1, the said shank of the steady rest being of U-shape and being provided in its arms with longitudinal slots 34 for the reception of the bolt 31 and provided in order to increase the range of adjustment of the steady rest. The manner in which the shank of the steady rest 33 straddles the intermediate portion of the body 1 will be readily understood from Figures 1 and 3 of the drawings, and by comparison of said figures it will be understood that each arm of the shank of the steady rest is merged into a crescent shaped head 35, and that the forward edges of the said head describe arcs of circles. A shaft under measurement is illustrated by dotted lines in Figure 1, and by reference to said figure it will be manifest that my novel gauge is susceptible of quick and easy application to a shaft for the gauging of the latter, and that when the steady rest 33 is properly set and adjustably fixed, it will assure accurate gauging of the shaft. Again it will be appreciated that my novel gauge is possessed of a wide range of adjustment and may therefore be applied to and used to advantage in conjunction with shafts and analogous devices of various diameters. The outer round end or head of the arm 8 is disposed in a correspondingly shaped socket 30 in the pin 19, and consequently it will be understood that incident to a gauging operation, swinging movement of the lever 8 will attend rectilinear movement of the pin 9 so that any unevenness in a shaft that is being gauged will be readily discernible from the position of the pointer 13 to the graduated scale 14 on the dial. It follows from this that my novel gauge is of quick reading type; and it will also be appreciated that no great amount of skill is required for the proper application of my novel gauge to a shaft, and that largely due to the employment of the steady rest 33 the gauge is adapted to accurately gauge shafts while the same are being rotated.

I have entered into a detailed description of the construction and relative arrangement of the parts embraced in the present and preferred embodiment of my invention in order to impart a full, clear and exact understanding of the said embodiment in all of its details. I do not desire, however, to be understood as limiting myself to the precise construction and arrangement of parts as disclosed, my invention being defined by my appended claims within the scope of which changes in structure and in arrangement may be made without departure from my invention.

Having described my invention, what I claim and desire to secure by Letters-Patent, is:—

1. A gauge comprising a body having spaced arms, shaft engaging devices carried by said arms, one of said devices being movable, indicating means connected with and operable by said movable device and a steady rest carried by the body and having a head provided with a concave portion, and arranged to be placed in engagement with a shaft interposed between said devices.

2. A gauge comprising a body having spaced arms, shaft engaging devices carried by said arms, one of said devices being movable, indicating means connected with and operable by said movable device and a steady rest carried by the body and arranged to be placed in engagement with a shaft interposed between said devices; the said steady rest and the said body being slotted, and a bolt being positioned in said slots for the connection of the said parts, and the steady rest having a head the forward side of which is concave and constitutes an arc of a circle.

3. A gauge comprising a body having spaced arms, shaft engaging devices carried by said arms, one of said devices being movable, indicating means connected with and operable by said movable device and a steady rest carried by the body and arranged to be placed in engagement with a shaft interposed between said devices; the said body and the said steady rest being slotted, and the steady rest including a U-shaped shank straddling the body, and head portions at the ends of the arm of the shank and each head portion having a forward edge of concave form.

4. In a gauge and in combination, a body having a bore, and also having a chamber in communication with said bore, a rectilinearly movable pin disposed in said bore and having a recess in one side, a threaded nut closing one end of said bore, a spring interposed between said nut and said pin, a lever fulcrumed at an intermediate point of its length in said chamber and having an end portion engaged with the pin and having a gear sector at its opposite end, a pointer mounted on the body, a circular scale on the body for cooperation with said pointer, a train of gears intermediate of said sector gear and said pointer for moving the latter by the former, a spring connected with the body and one gear and arranged to take up slack of the gears, and means carried by the body and disposed in the recess of the pin for limiting the movement of the pin.

In testimony whereof I affix my signature.

HENRY A. SCHWARZ, Jr.